Dec. 19, 1944.   A. S. DENNIS   2,365,527
CALCULATING MACHINE
Filed Dec. 30, 1941    14 Sheets-Sheet 1
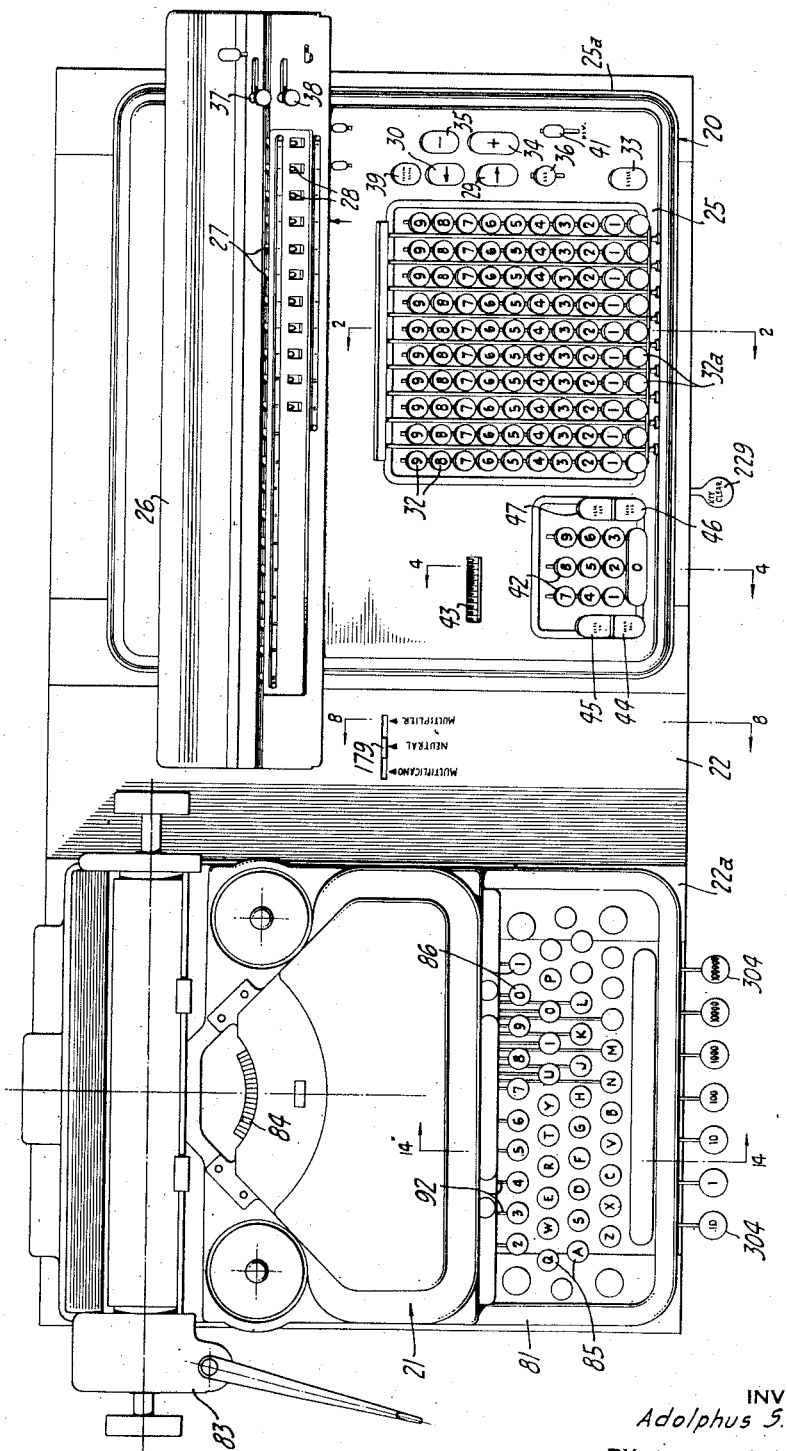
INVENTOR
Adolphus S. Dennis
BY Harper Allen
ATTORNEY Dec. 19, 1944. A. S. DENNIS 2,365,527
CALCULATING MACHINE
Filed Dec. 30, 1941 14 Sheets-Sheet 2
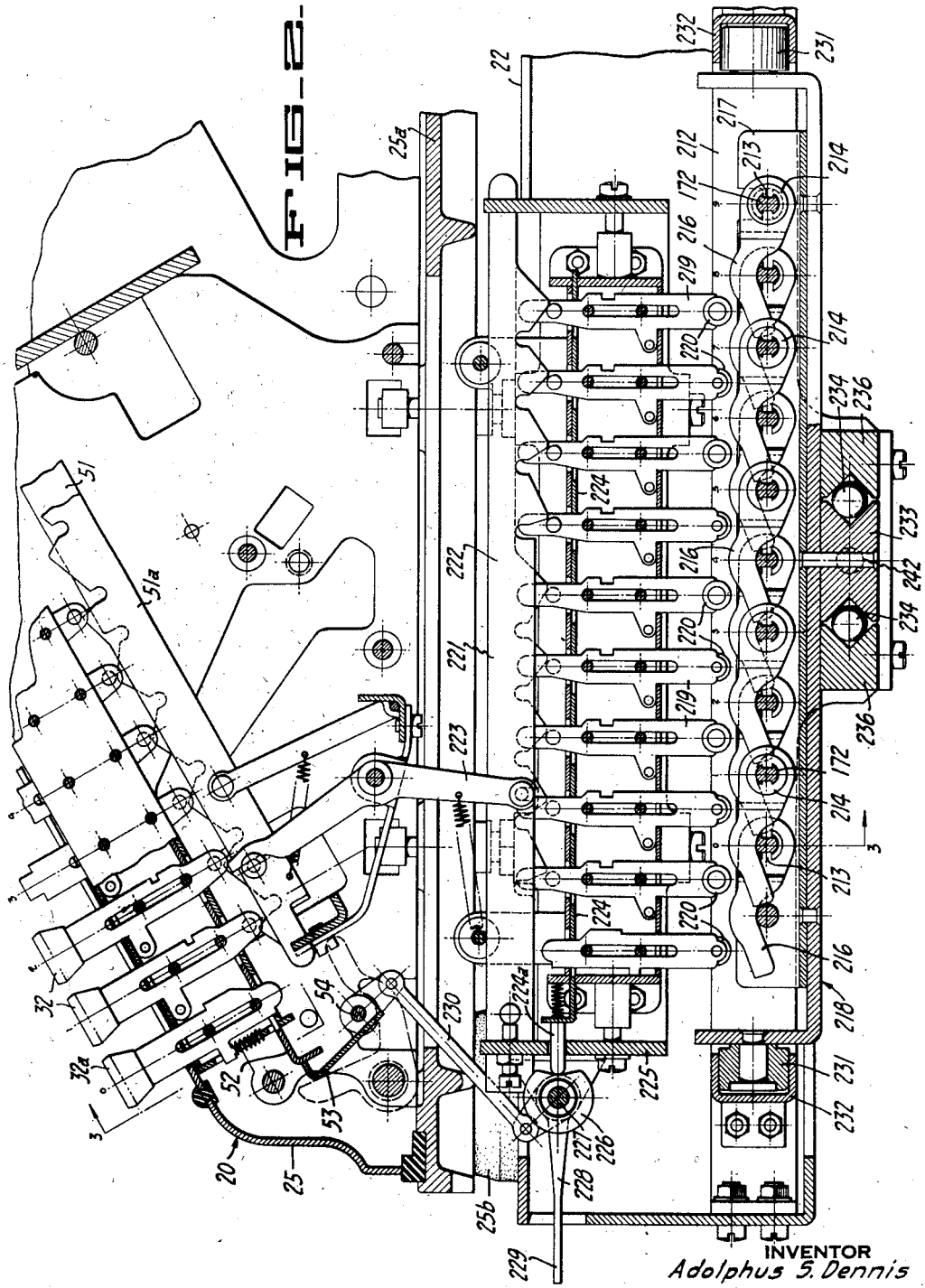
INVENTOR
Adolphus S. Dennis
BY Harper Allen
ATTORNEY

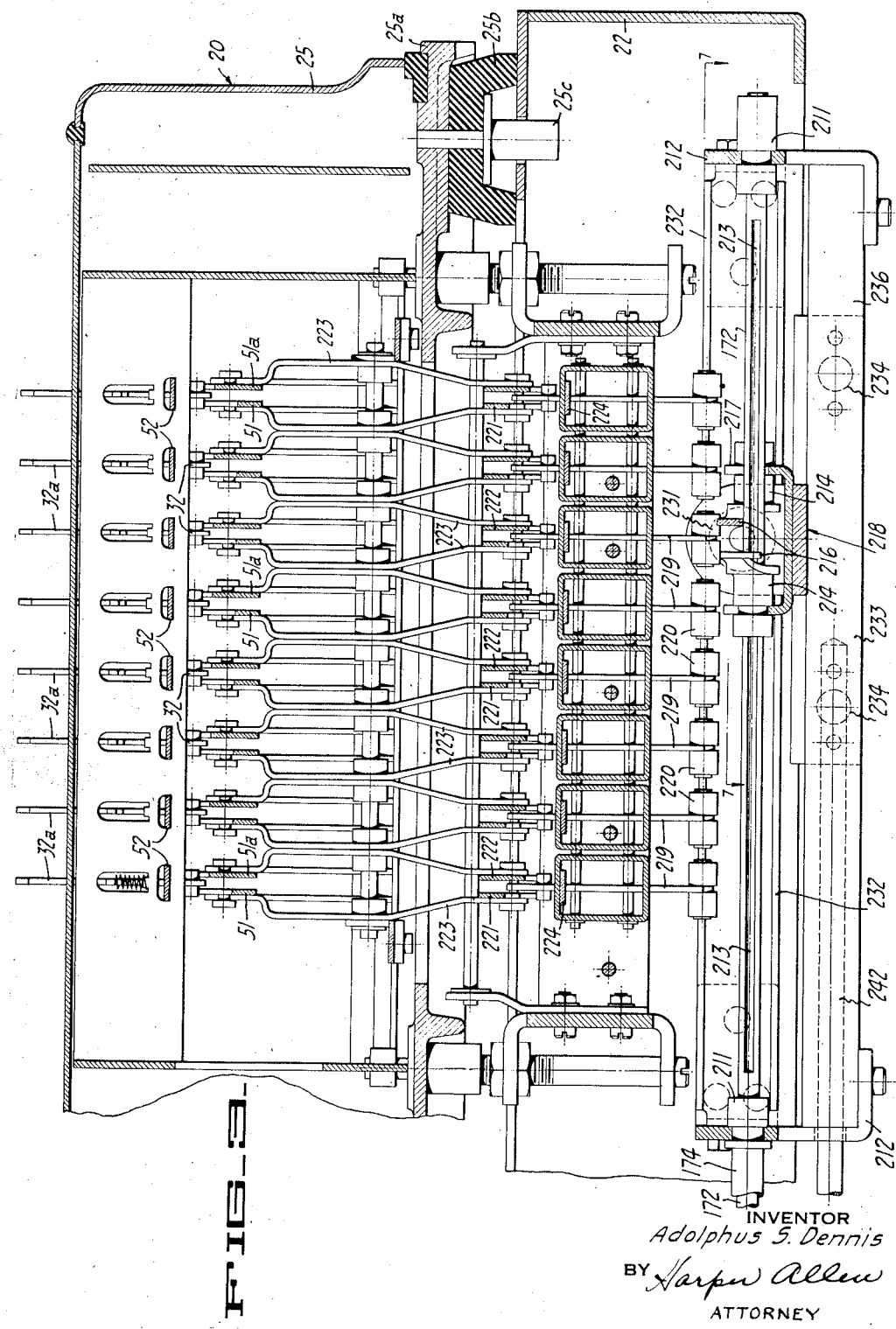

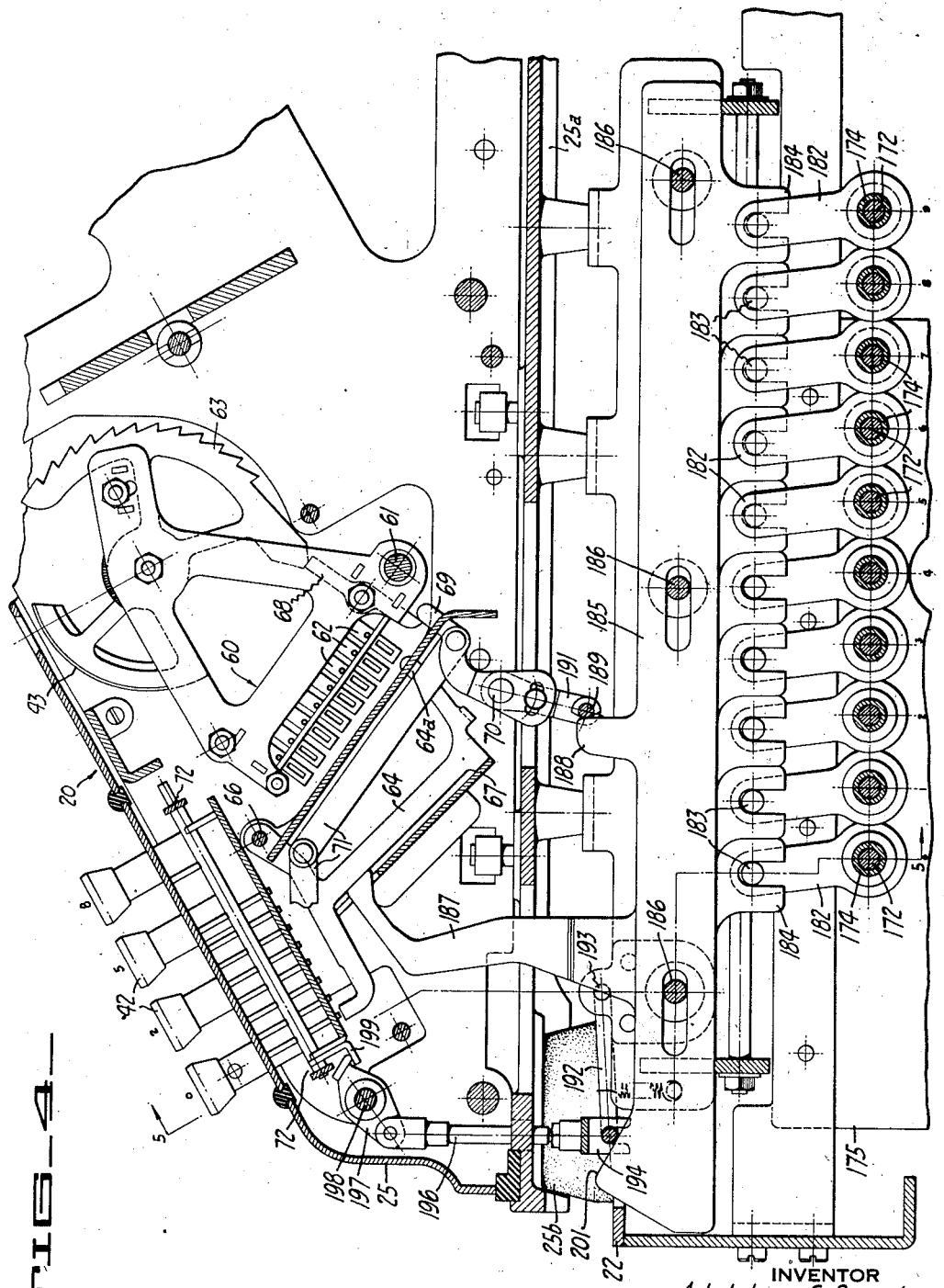

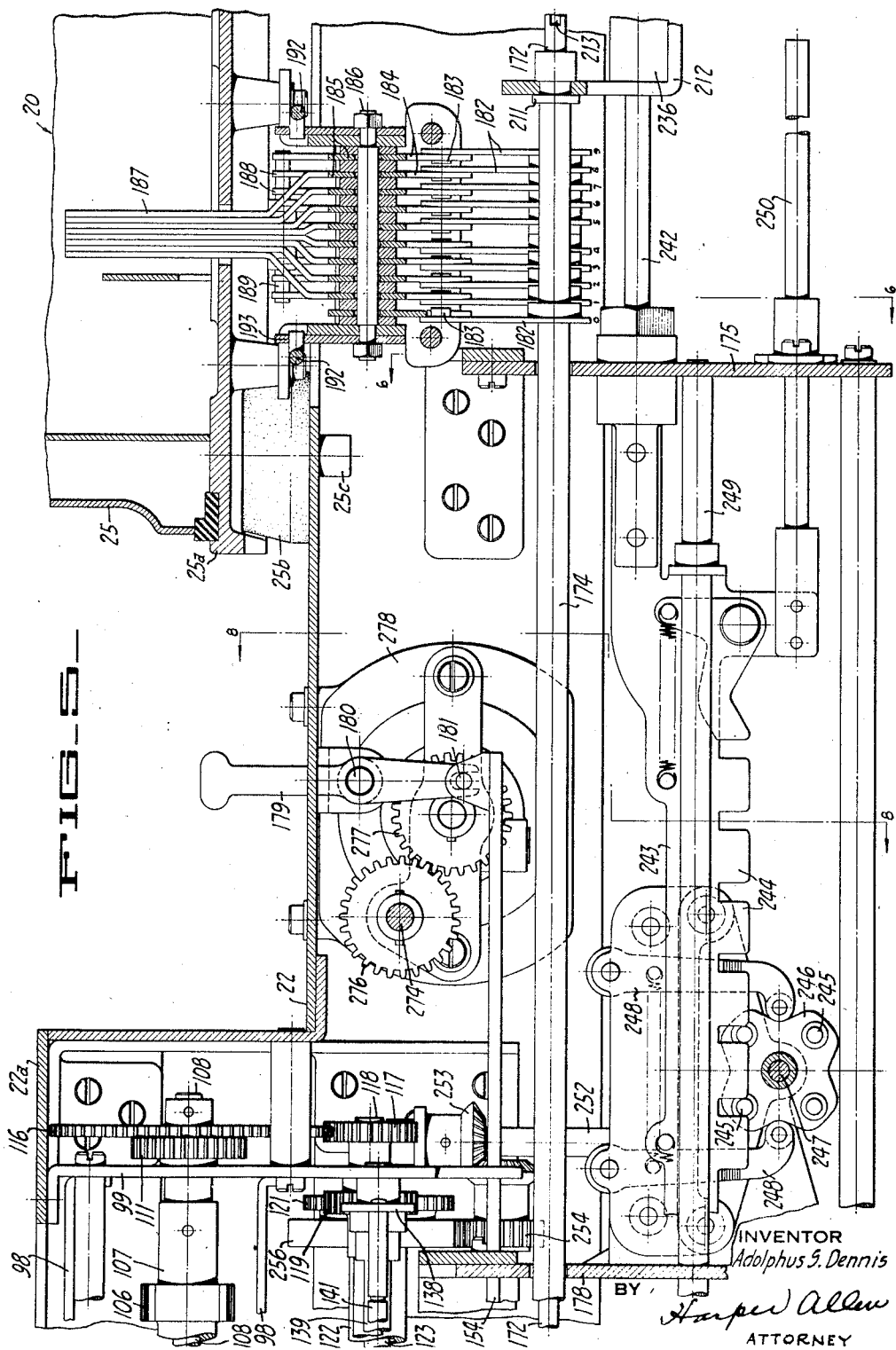

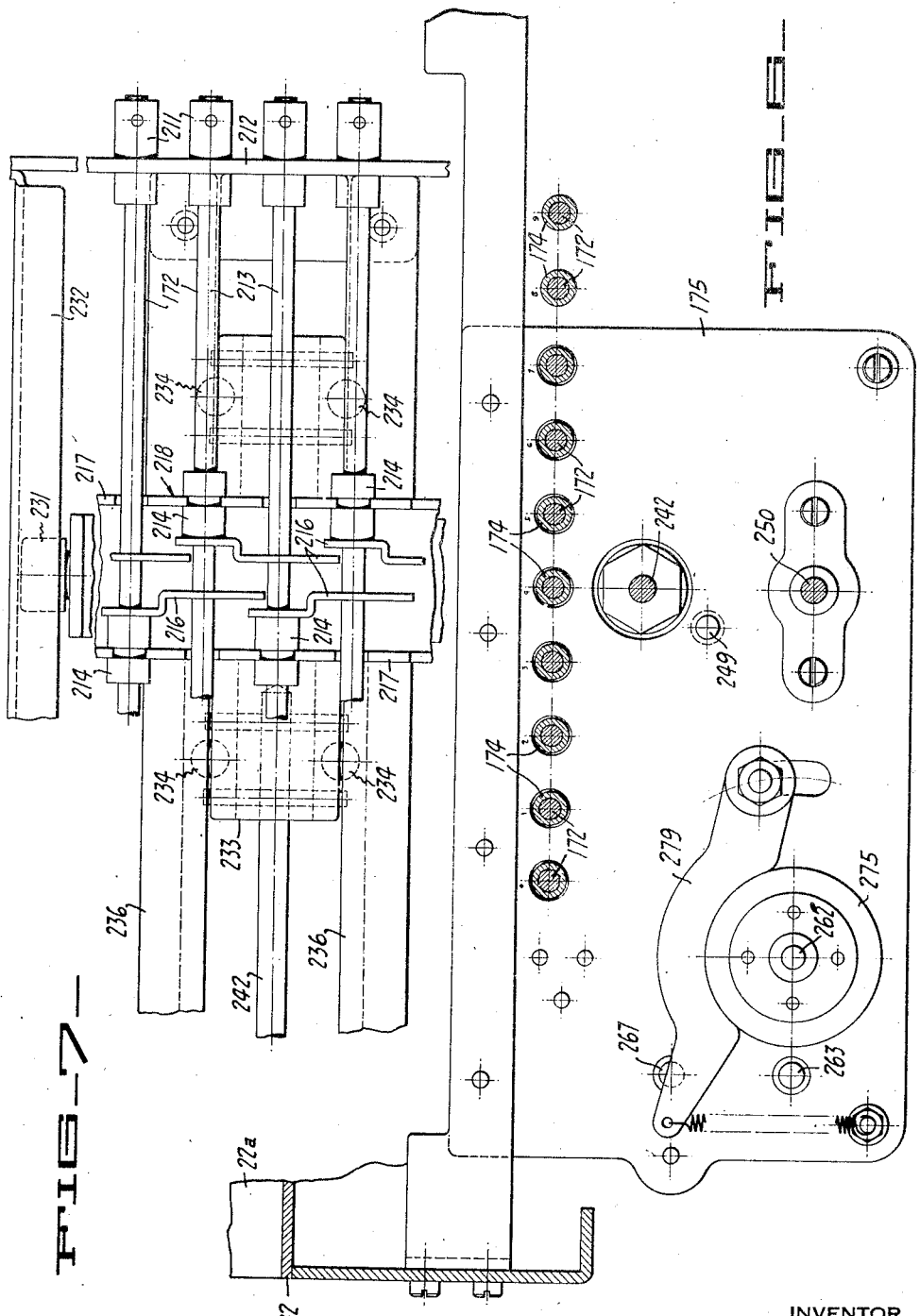

Dec. 19, 1944.  A. S. DENNIS  2,365,527
CALCULATING MACHINE
Filed Dec. 30, 1941  14 Sheets-Sheet 7
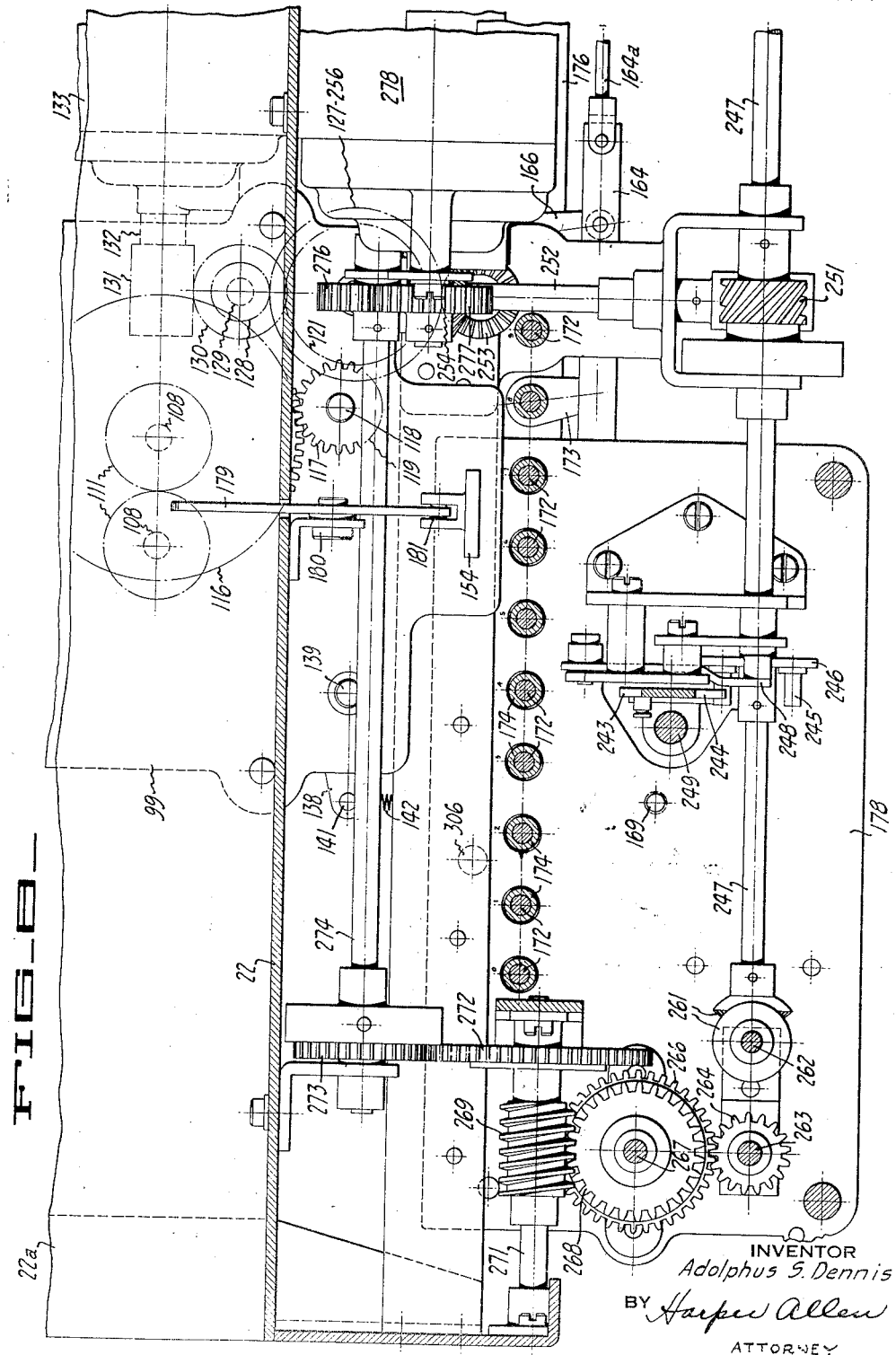
INVENTOR
Adolphus S. Dennis
BY Harper Allen
ATTORNEY

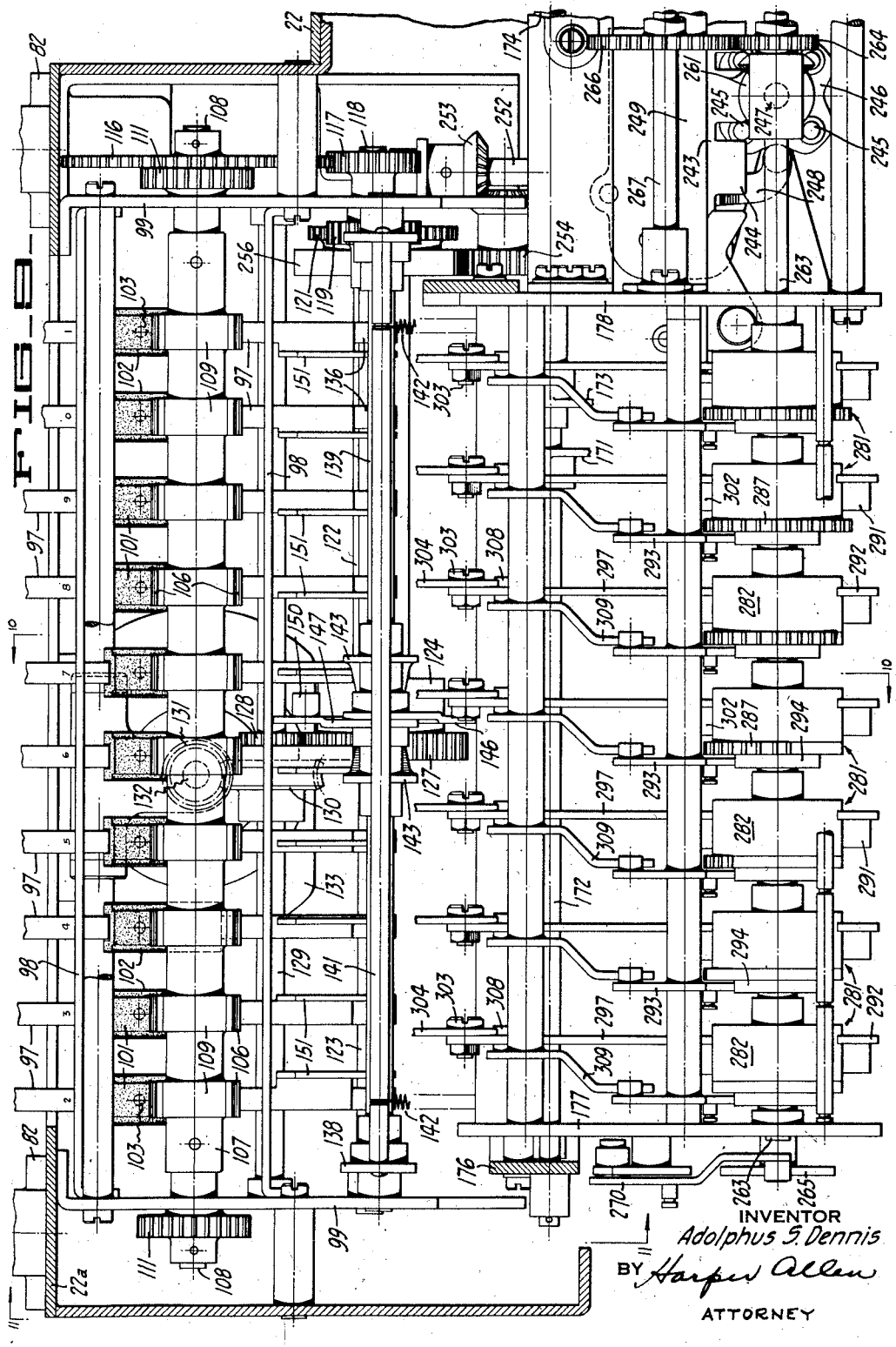

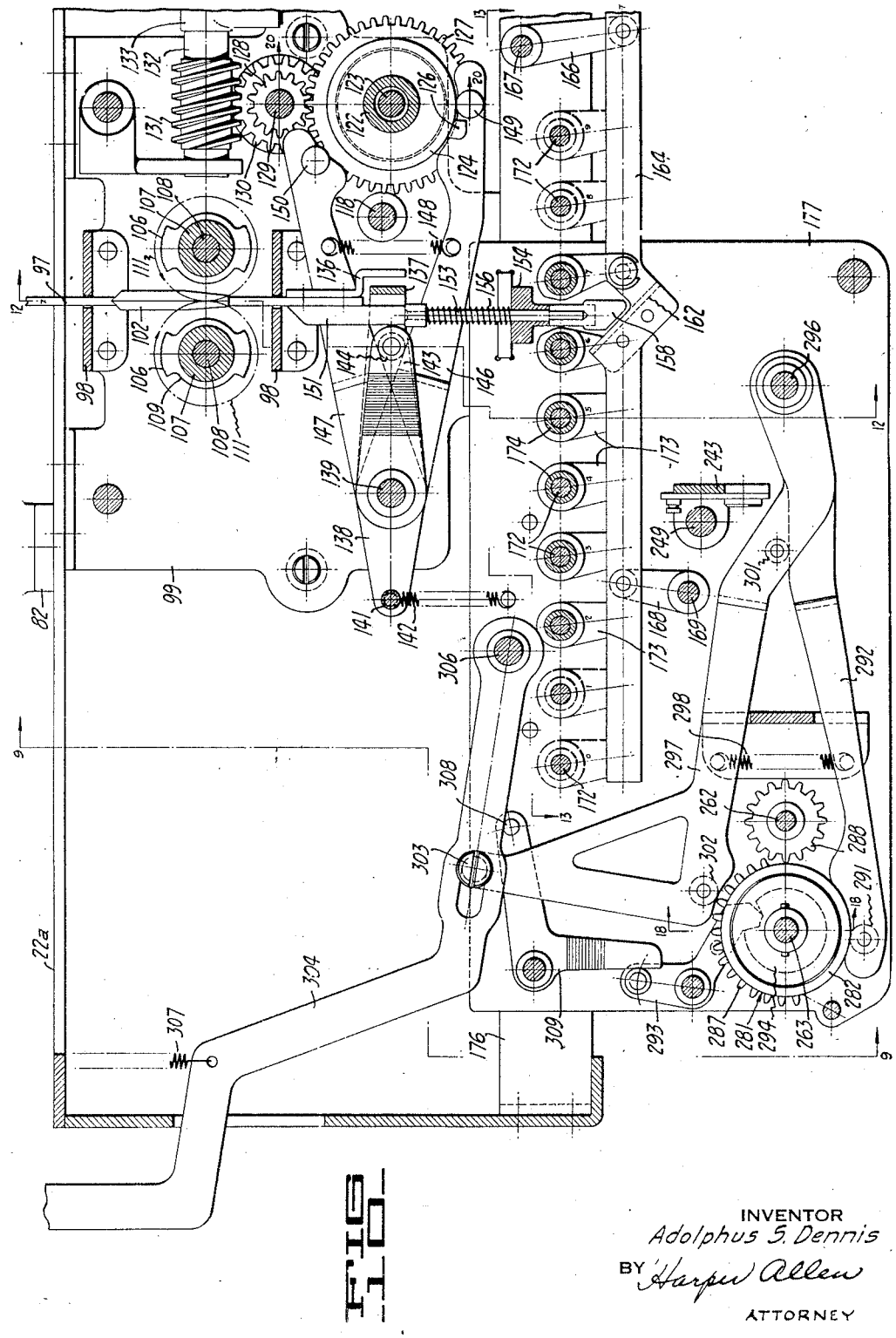

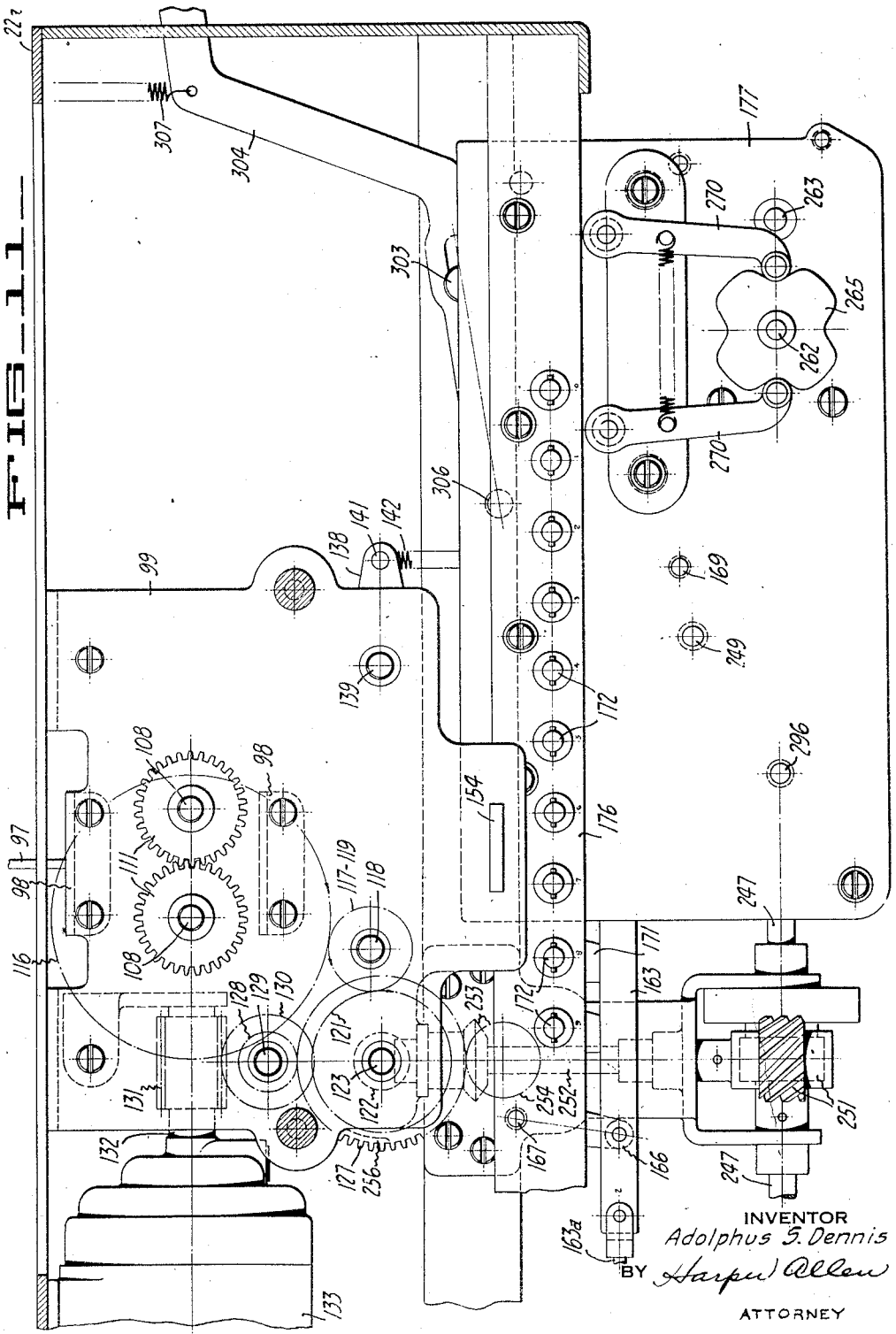

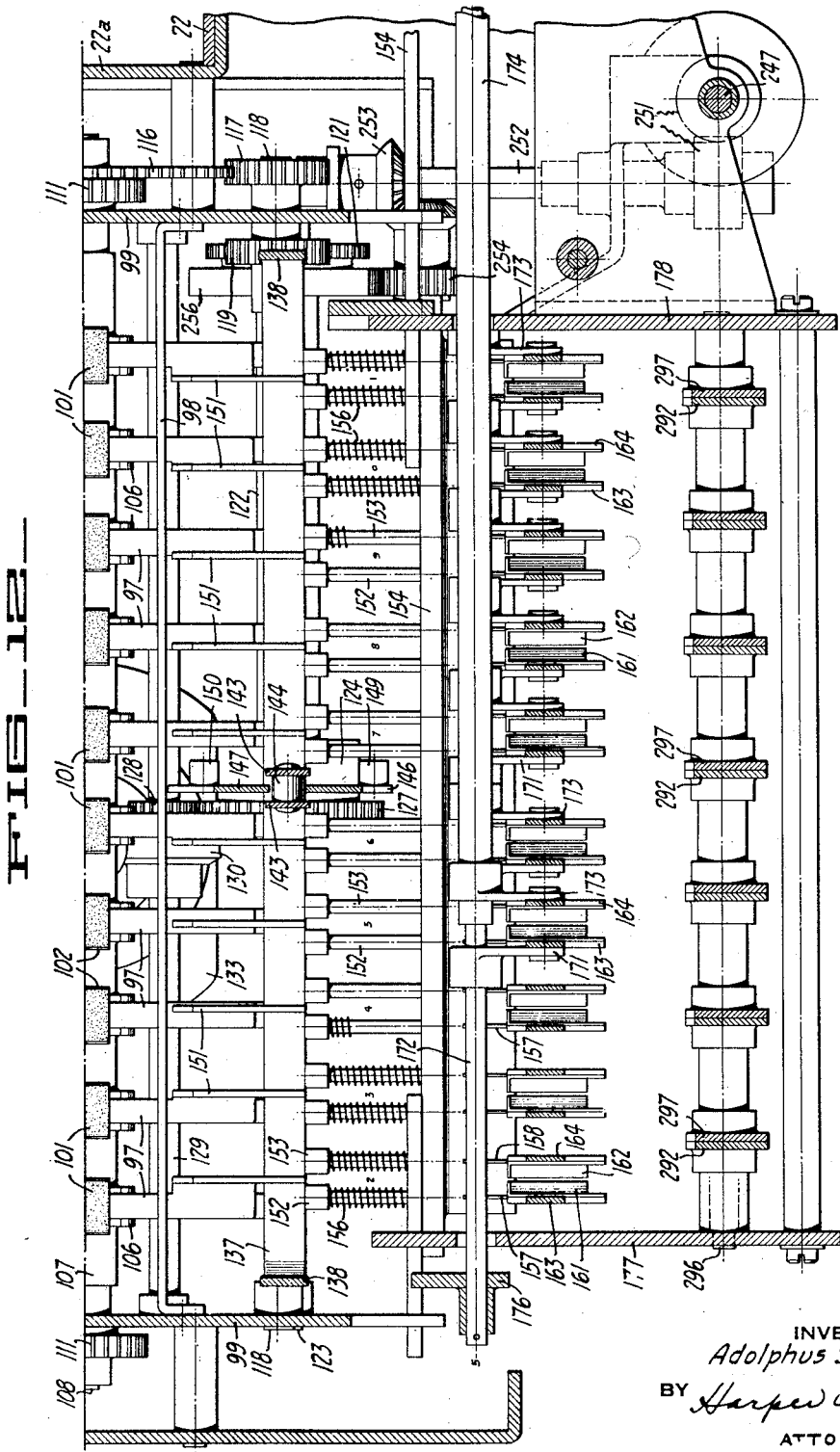

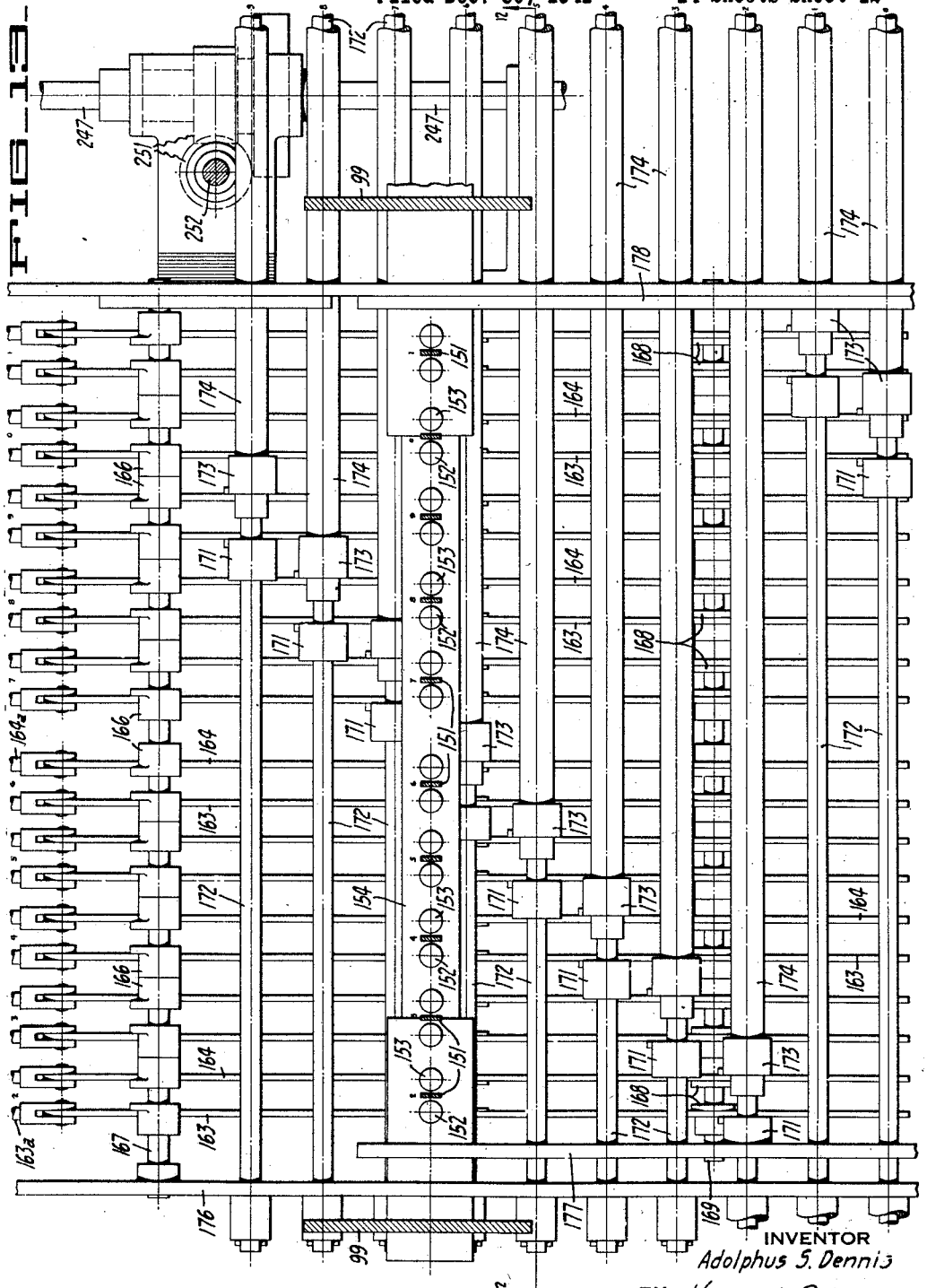

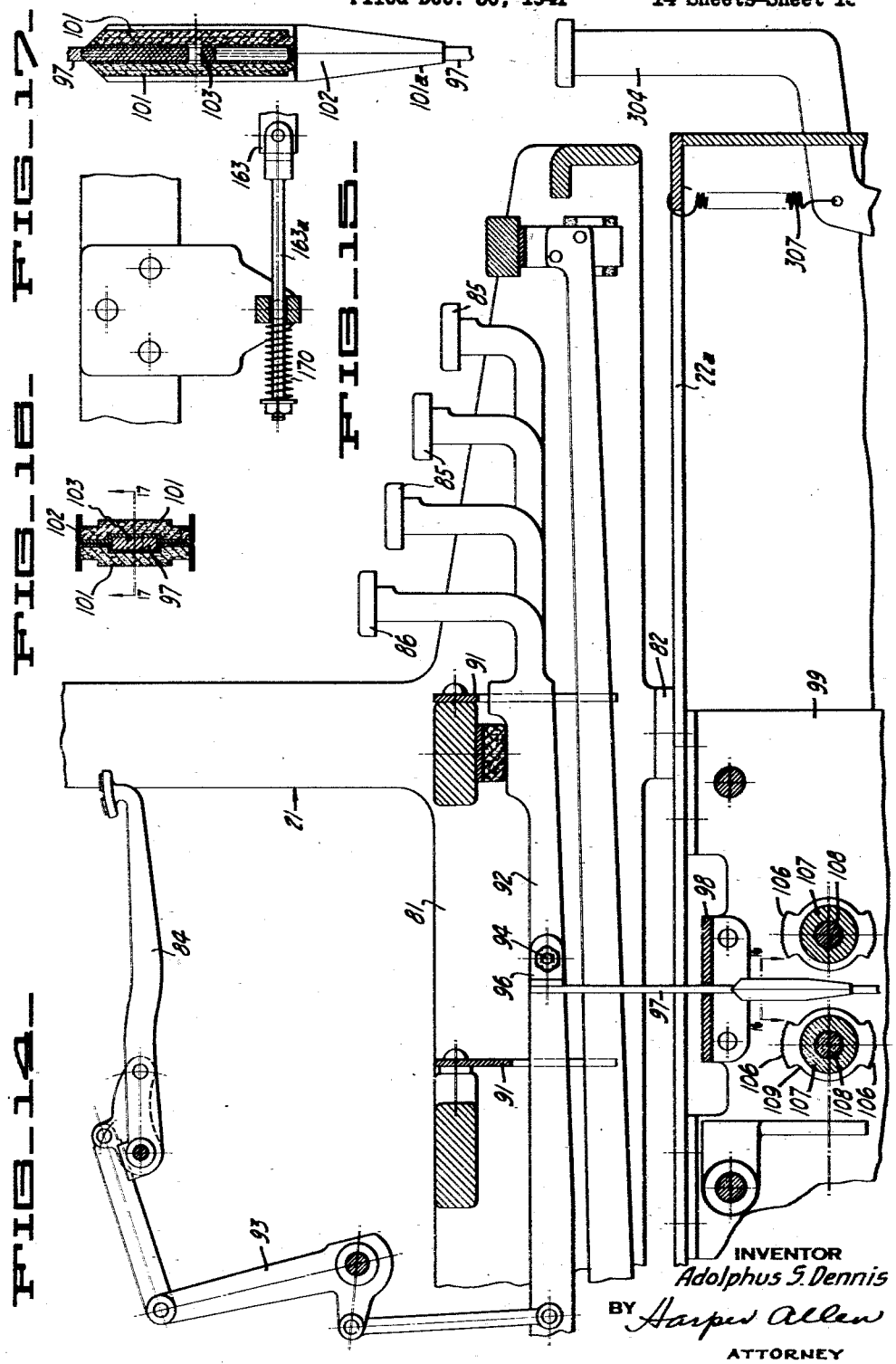

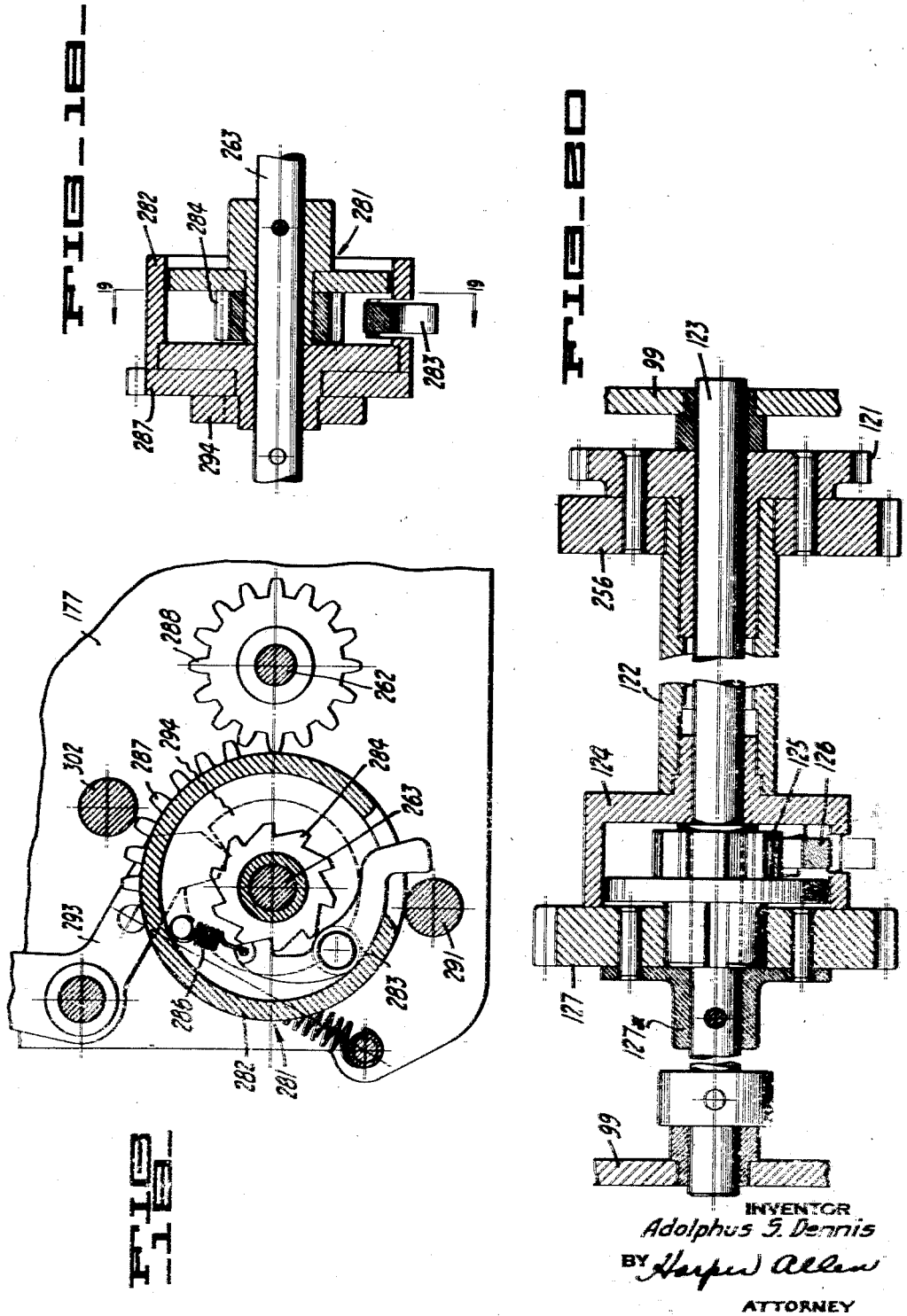

Patented Dec. 19, 1944

2,365,527

UNITED STATES PATENT OFFICE 2,365,527

CALCULATING MACHINE

Adolphus S. Dennis, Oakland, Calif., assignor to Friden Calculating Machine Co., Inc., a corporation of California Application December 30, 1941, Serial No. 424,959

2 Claims. (Cl. 235—60)

This invention relates to calculating machines and is concerned more particularly with the provision of a combined typewriter and calculating machine in which the number keys of the typewriter can control setting of the multiplier and multiplicand values in the calculating machine.

It is a general object of the invention to provide an improved machine in which typewriter number keys can control a multiplying operation.

Another object of the invention is to provide for selective control by typewriter number keys over both multiplier and multiplicand selection mechanisms.

Another object of the invention is to provide operation of the keys of a typewriter by power.

Another object of the invention is to provide an attachment whereby conventional typewriter mechanism can be employed in conjunction with conventional calculator mechanism to perform a plural order multiplying operation under control of values written by the typewriting mechanism.

Other objects and advantages of the invention will be apparent from the following description of a preferred embodiment thereof as illustrated in the accompanying drawings, in which:

Figure 1 is a plan view of the combined machine.

Figure 2 is a fragmentary sectional view through the multiplicand selection mechanism of the machine, the view being taken as indicated by the line 2—2 in Figure 1.

Figure 3 is a vertical sectional view of the mechanism shown in Figure 2 taken as indicated by the line 3—3 in Figure 2.

Figure 4 is a sectional elevational view of the multiplier selection mechanism of the machine taken as indicated by the line 4—4 in Figure 1.

Figure 5 is a sectional transverse elevational view of the mechanism as illustrated by the line 5—5 in Figure 4.

Figure 6 is a sectional view of a portion of the control mechanism taken as indicated by the line 6—6 in Figure 5.

Figure 7 is a plan view of a portion of the multiplicand selection control mechanism taken as indicated by the line 7—7 in Figure 3.

Figure 8 is a sectional elevational view of a part of the control and drive mechanisms taken as indicated by the line 8—8 in Figure 5.

Figure 9 is a front elevational view of mechanism below the typewriter, the view being taken inside the housing as indicated by the line 9—9 in Figure 10.

Figure 10 is a sectional elevational view of typewriter key control and a portion of the tabulating control mechanism taken as indicated by the line 10—10 in Figure 9.

Figure 11 is an elevational view of a part of the drive mechanism, the view being taken as indicated by the line 11—11 in Figure 9.

Figure 12 is a sectional elevational view of the number key controlled selecting means, the view being taken as indicated by the line 12—12 in Figure 10.

Figure 13 is a sectional plan view of the selection control mechanism extending from the typewriter number keys to the multiplier-multiplicand selection mechanism, the view being taken as indicated by the line 13—13 in Figure 10.

Figure 14 is a fragmentary sectional view of the typewriter construction with parts shown in elevation, the view being taken along the line 14—14 in Figure 1.

Figure 15 is a fragmentary view partly in section of a rocker arm for the selection control mechanism.

Figure 16 is a detailed sectional view taken as indicated by the line 16—16 in Figure 14.

Figure 17 is a cross sectional view taken along the line 17—17 in Figure 16.

Figure 18 is a sectional view of a typical clutch mechanism taken as indicated by the line 18—18 in Figure 10.

Figure 19 is a sectional view of the clutch mechanism taken as indicated by the line 19—19 in Figure 18.

Figure 20 is a sectional view of a portion of the drive mechanism for the multiplicand selection carriage taken as indicated by the line 20—20 in Figure 10.

The combined typewriting and calculating machine as illustrated in Figure 1 comprises a conventional form of calculator 20 and a conventional form of typewriter 21 which are mounted on a common base 22. The calculator 20 is of the character employed for carrying out addition, subtraction, division, and multiplication, the latter mechanism being preferably of the character adapted to carry out plural order multiplications in an automatic manner as hereinafter described. The typewriter 21 may be of the usual manually operated type although it is preferred to employ power operation for at least some of the keys, for example the number keys as later described.

Calculator

The calculator selected for purposes of illustration is of the character disclosed in the patent to Carl M. Friden No. 2,229,889, dated January 28, 1941, and the copending applications of Carl M. Friden, Serial No. 205,546, filed May 2, 1938, and of Carl M. Friden and Anthony B. Machado, Serial No. 348,966, filed July 31, 1940.

Referring to Figure 1, the calculator includes a body 25 in which the actuating, selecting, and control mechanisms are mounted and carriage 26 which is mounted for endwise shifting movement transversely of the body 25 and which carries numeral wheels 27 and 28 of the accumulator and revolutions counter, respectively. Carriage 26 can be shifted by power in either direction by manipulation of respective shift keys 29 and 30 through mechanism of conventional character.

Body 25 of the calculating machine includes a base 25a (Figure 5) whose supporting feet 25b rest on base 22 and may be located thereon and secured thereto by studs 25c.

Values are entered into the calculator by depression of numeral keys 32 of the usual value entering or multiplicand keyboard in the various ordinal rows thereof, keys 32 being releasable individually by depression of ordinal clear keys 32a or collectively by depression of clear key 33. Values introduced into the calculator may be registered additively or subtractively on numeral wheels 27 by depression of plus key 34 or minus key 35, respectively. If desired, add key 36 may be depressed to cause clearing of the keyboard in the usual manner and for single registration in the accumulator.

Values registered in numeral wheels 27 and 28 can be removed through resetting mechanism operated by manipulation of respective manually operable resetting handles 37, 38 or by power through depression of return and clear key 39. Upon operation of key 39, the carriage 26 is returned to its farthest left position where a resetting operation of both the accumulator and the revolutions counter or either is effected.

The calculator is adapted to perform automatic plural order division by means of conventional division mechanism including starting control lever 41. Automatic predetermined multiplication can also be performed by depression of the multiplier selection keys 42 to set up the desired multiplier figure as indicated on dials 43 and by depression of one of multiplication keys 44, 45 or 46 to start the multiplying operation. Key 47 is a correction key for correcting the multiplier figure and zeroizing the indicating dials 43.

*Multiplicand selecting mechanism.*—The multiplicand selecting mechanism controlled by the numeral keys 32 (Figure 2) is of the character disclosed in said Patent No. 2,229,889. Only those portions of this selecting mechanism necessary to an understanding of the instant invention are shown and will be described. Each bank or order of keys 32 (Figure 2) cooperates with a pair of similar spring-urged value selecting slides 51, 51a which are mounted for endwise movement by suitable supporting means. Slide 51 is provided with cam surfaces of varying inclination for cooperation with suitable pins of certain of keys 32 to effect a differential movement of the slide 51 to the left from the position shown in Figure 2. The amount of the movement is dependent upon the value of the associated key 32. Slide 51 of each order cooperates with "1" to "5" keys 32 of a bank, while the slide 51a cooperates with the "6" to "9" keys of a bank.

Each selecting slide 51 and 51a is connected at its rear end with suitable gearing adapted to transmit values to the numeral wheels from the associated actuating cylinders as disclosed in said patent.

Each bank of keys 32 (Figure 2) has a latch slide 52 of conventional construction associated therewith to latch any depressed key 32 in depressed position against the tension of the spring associated therewith. Latching slides 52 are operable individually to release depressed keys by ordinal clear keys 32a or collectively by oscillation of key release bail 53 pivoted at 54. Bail 53 is operable in response to depression of clear key 33 or by power under control of key 36 as disclosed in said patent.

*Multiplier selection mechanism.*—The selection mechanism for the multiplier figures is of the type disclosed in said application 205,546.

Generally such mechanism comprises a ten key keyboard including keys 42 (Figure 4) and an ordinally shiftable pin carriage 60 associated therewith. Pin carriage is mounted for step-by-step movement transversely of the machine by means including rod 61. Pin carriage 60 has ten ordinal rows of settable stop pins 62 and ten ordinal differentially adjustable elements 63 in the form of racks in which digits of the multiplier may be set successively for subsequent control of the multiplying operation. In order to set up the multiplier digits, each pin row includes eight pins 62 corresponding to the one to eight keys and a fixed stop cooperating with the aligned rack 63 and corresponding to the nine key. A depressed multiplier key 42 operates through an associated selection lever 64 to set the corresponding pin 62 in aligned ordinal row to active or raised position. There are eight selection levers 64 having their ends 64a terminating in a common plane in alignment with one of the rows of stop pins 62. Each selection lever 64 is pivoted at 66 and is gravity urged against a stop plate 67.

At the same time that a pin 62 of the pin carriage is moved to active position, the aligned rack 63 is released to move into engagement with the pin and thereby be set differentially in accordance with the value of the depressed key. For this purpose, each stop 68 for rack 63 is aligned with and adapted for release by releasing arm 69 pivoted at 70 and connected by a suitable means including a link 71 for operation upon depression of any of the multiplier keys 42 including the nine key.

Each multiplier selection key 42 is also associated with a suitable escapement mechanism, a portion of which is seen at 72, so that the pin carriage 60 is released to move one step upon depression of each key 42 in a manner fully disclosed in said application 205,546.

In the above manner, the multiplier digits are set up in the multiplier selection mechanism, the setting operation beginning with the highest order digit of the multiplier in the embodiment illustrated.

*Multiplier operation and control.*—The differentially adjusted positions of the racks 63 are utilized to control the number of registrations of the multiplicand in the accumulator in the respective ordinal positions thereof and the return of each rack to its initial position is used to control the ordinal shift of the accumulator after each ordinal multiplication as well as to shift the pin carriage 60 so that the next higher order rack 63 comes into controlling position with respect to the operation of the machine.

The operating and control mechanism is brought into play under the control of any of keys 44, 45 and 46 in any convenient manner, for example as disclosed in said application, 348,966.

Typewriter

Referring to Figure 1, the typewriter indicated at 21 may be of any conventional construction and includes a frame 81 (Figures 1 and 14) having feet 82 resting upon and secured to a raised portion 22a of the main frame or base 22. The typewriter includes a paper carriage 83 (Figure 1) of the usual construction and type bars 84 which are operated in the usual manner from the letter keys 85 and number keys 86. As shown, the row of number keys may also include a key for the number "1" as a variation from the standard keyboard, so that all the number keys 86 are arranged in a single row.

While a conventional, hand operated typewriting machine may be employed, it is preferred to provide power operation for the number keys 86 which are also utilized, as later described, to set values into both the multiplicand and multiplier selection mechanisms of the calculating machine.

*Power operation of typebars.*—Referring to Figure 14, the number key 86 corresponding to "5" is shown guided in the usual spaced combs or guides 91. The key is suitably pivoted at its rearward end in the usual fashion in a manner not shown. Key stem 92 is connected by a suitable linkage 93 to the associated type bar 84. Key stem 92 is pivotally connected at 94 to a slotted angle bracket 96 removably carried by an auxiliary key stem 97. Key stem 97 extends in a plane at right angles to the key stem 92 and is guided by transverse horizontal guide plate 98 suitably secured at its ends to brackets 99 depending from the portion 22a of the base. It will be understood that an auxiliary stem 97 is provided for each of the number keys 86.

Below the guide plate 98, each auxiliary key stem 97 (Figures 15, 16 and 17) is provided with opposed drive faces 101 of suitable material such as rubber, cork or the like, each of which is mounted in a pressed steel holder 102. The respective holders 102 of each auxiliary key stem are suitably secured as by rivet 103 to the stem 97 (Figures 16 and 17). As seen in Figure 17, each drive face 101 has a lower tapering end 101a. Ends 101a provide a V-shaped lower end of the driving faces which is normally out of the path of segmental drive portions 106 of rotatable driving rollers 107 secured on respective shafts 108. Rollers 107 may be formed of material suitable to grip and actuate the stems 97 in a positive manner without slip or loss of power. Each drive portion 106 is of less axial width than the spacing between the flanges of the cooperating retainer 102 and extends circumferentially for approximately 60° and is diametrically opposite to a similar driving portion, from which it is separated by portions of reduced diameter 109 which will clear even the thicker parallel surfaces of the drive faces 101.

The rollers 107 have their shafts 108 journalled in brackets 99 and are geared together by means of respective gears 111 (Figures 9 and 10) at each end thereof.

The drive for gears 111, shafts 108, and rollers 107 is placed under control of the number keys of the typewriter, whereby upon depression of a key a half-cycle movement of the rollers takes place after which the drive is interrupted if the key is maintained depressed until release of the key when the last half-cycle of the movement is completed. The rollers are effective during the first half-cycle to effect operation of the type bar corresponding to the key depressed, while the parts may be restored to normal position during the last half-cycle of the operation. As shown, the rollers 107 move through one-half revolution for each typing cycle.

As seen in Figure 8, one shaft 108 for one of gears 111 carries a large gear 116 which meshes with a small gear 117 secured on a shaft 118 journalled in the adjacent bracket 99. As seen in Figure 12, shaft 118 carries a gear 119 at the left-hand side of bracket 99 similar to gear 117 (see Figure 11). Gear 119 meshes with a gear 121 secured on a tubular shaft 122 (Figures 9, 11 and 20) which is suitably journaled on the shaft 123 journaled in the brackets 99. Tubular shaft 122 (Figures 10 and 20) is connected to a clutch housing 124 of conventional construction and adapted to be driven by a driving clutch element including ratchet gear 125 secured on shaft 123. Clutch control dog 126 pivotally secured to housing 124 is provided for controlling the driving engagement between ratchet gear 125 and clutch housing 124, as hereinafter described. Driving ratchet 125 has a keyed connection with a gear 127 (Figure 20) having its hub 127a pinned on shaft 123. Gear 127 (Figure 10) is driven by a pinion 128 secured on a suitably supported shaft 129. Shaft 129 also carries a worm wheel 130 which meshes with a driving worm 131 secured on motor shaft 132 of constantly running motor 133 (Figures 8, 10 and 11).

In order to control the engagement of the clutch for the power driven means of any typewriter number key, stem 97 (Figure 10) is provided with a clutch operating bracket 136 (Figure 10) which overlies a transverse clutch operating bar 137 extending between and integrally formed with end levers 138 secured on transverse shaft 139. Opposite the bail portion 137, the levers 138 are connected by cross rod 141 (Figures 9 and 10) having a pair of springs 142 connected thereto adjacent the ends of the rod. Also secured on shaft 139 are a pair of similar arms 143 connected by a transverse pin 144 which is disposed between respective clutch controlling levers 146 and 147 which are journaled on shaft 139 between the hubs of arms 143 and have their outer ends offset to lie in the same plane as seen in Figure 12. Clutch controlling arms 146 and 147 are connected by spring 148 (Figure 10). It will be understood that the bail 137 extends along the entire row of number keys and their auxiliary stems 97 for operation by any one of these keys.

Normally the clutch controlling lever 146 is held in clutch disengaging position as shown in Figure 10 where stud 149 engages the tail of clutch dog 126. Upon depression of a key 97 the bail 137, levers 138 and shaft 139 are rocked downwardly from the position shown in Figure 10 to release the clutch and at the same time the arm 147 is moved down to clutch disengaging position by means of spring 148.

Thus, upon depression of an auxiliary number key stem 97, the clutch is engaged and will determine a drive for the rollers for either a partial or a full cycle. If the key is maintained depressed, the clutch becomes disengaged after a partial cycle by the engagement of stud 150 on an arm 147 with the clutch dog 126. Upon subsequent release of the depressed key 97, the clutch is again engaged and completes its drive cycle and is disengaged by stud 149 on arm 146. If a number is depressed and immediately released as in normal typing operations, the clutch performs a complete revolution under control of arm 146 and stud 149 thereon.

*Multiplication control.*—As previously explained, the number keys of the typewriter can be selectively employed to set both the multiplier and multiplicand values into the corresponding selection mechanisms of the calculator or, if desired, the number keys can be used in the usual fashion without such setting.

As seen in Figures 10, 12 and 13, each auxiliary stem 97 of a number key is provided with a flange or extension 151 extending at right angles to the general plane of the key stem and extending downwardly adjacent the bail 137 as seen in Figure 10. For selective cooperation with each of the extensions 151, a pair of spring urged plungers 152, 153 (Figures 10, 12 and 13) are provided which are mounted for endwise sliding movement in a transverse rail 154 and are spring-urged upwardly by respective springs 156. Plungers 152, 153 carry respective cam elements 157, 158 at their lower ends which engage the lower face of rail 154 to limit upward movement of plungers 152, 153. As seen most clearly in Figure 13, an adjacent pair of plungers 152 and 153 are spaced apart a distance slightly greater than the width of the key stem extension 151 so that the key can be depressed without operating either of the plungers. However, upon sliding movement of the set of plungers 152 and 153 to either the right or left from the position shown in Figure 13, one or the other of the plungers will come into operative position below the associated extension 151.

As seen in Figure 10, cam element 157 or 158 of plungers 152, 153 are constantly in operative relation with respective cooperating cam surfaces 161 and 162 carried by respective associated slides 163 and 164. Each slide 163, 164 is carried at one end by a depending arm 166 pivoted on a transverse shaft 167 and is supported adjacent its other end by an upstanding arm 168 pivoted on a transverse shaft 169. Thus each of the slides 163, 164 is mounted for endwise sliding movement in the event the associated plunger is depressed by the associated number key. Thus each number key of the typewriter has associated therewith a pair of slides which may be selectively operated through the associated auxiliary key stem 97 by appropriate positioning of the slidable rail 154. Each slide 163, 164 is spring-urged to its initial inactive position as shown in Figure 10 by spring 170 (Figure 15) cooperating with a rod extension 163a (or 164a) pivotally connected to the associated slide.

Each slide 163 (Figures 10, 12 and 13) is pivotally connected to an arm 171 secured on a rod 172 and the associated slide 164 is pivotally connected to an arm 173 secured on a sleeve 174 which is disposed about the rod 172 with which the corresponding arm 171 and slide 163 is associated. Thus, for each of the number keys there is a rod 172 disposed within a sleeve 174. Rods 172 are pivotally supported at one end in a frame bar 176 (Figure 12) and at their other ends by bearing collars 211 (Figure 3) in frame brackets 212 later referred to. The rod 172 when rocked by the associated key stem 97 operates a correspondingly valued portion of the multiplicand selection mechanism of the calculating machine, while the sleeve 174 when operated by the associated key stem 97 operates the correspondingly valued portion of the multiplier selection mechanism.

The rail 154 (Figures 10, 11 and 13) is slidably mounted in respective brackets 177 and 178 which are suitably supported from the base 22 so that the operator can adjust whether the number keys of the typewriter are to control the calculator and if they are to control, whether they will control the multiplier selection or the multiplicand selection by appropriate endwise positioning of the rail 154. Rail 154 can be positioned manually by the operator through lever 179 (Figures 1 and 5) pivoted at 180 and engaging pin 181 on an extension of rail 154. As seen in Figure 1, lever 179 can be adjusted in either direction from a central neutral position.

*Multiplier selection.*—As seen in Figures 4 and 5, the ten tubes 174 corresponding to the number keys "0" to "9" extend from beneath the typewriter to a location beneath the calculator where the ends terminate in staggered relation. Each tube 174 is provided with an upstanding arm 182 having a pin 183 engaging in a forked portion 184 of an associated slide 185. Slides 185 are mounted for endwise sliding movement by slotted engagement with respective studs 186. Each slide 185 with the exception of the "0" slide 185 and the "9" slide 185 is provided with an upstanding finger 187 which is disposed behind the correspondingly valued selection lever 64 of the multiplier selection mechanism 60. Thus, upon rocking of any one of the multiplier selection sleeves 174 valued from "1" to "8," the correspondingly valued multiplier selection lever 64 will be moved to operative position. Slides 185 from "1" to "9" each have an upstanding ear 188 operatively related to a transverse rod 189 carried by depending arm 191 (Figures 4) secured to the lower portion of the rack releasing lever 69. Thus, at the same time that the pin 62 is set to operative position, the rack 63 will be released. It will be recalled that the release of a rack 63 without setting of a pin 62 results in setting the rack to its "9" position, so that the "9" slide 185 does not require a finger 187.

Also, means is provided for operating the escapement mechanism of the multiplier selection mechanism upon operation of a slide 185. This means comprises a bail 192 (Figure 4) which has its ends pivoted at 193 in suitable brackets on the frame. Bail 192 engages the forked lower end 194 of an adjustable connection 196 which extends upwardly and is connected to lever 197 pivoted at 198. One end of lever 197 overlies a lip 199 of the multiplier escapement mechanism 72. Each slide 185 is provided with a cam surface 201 for cooperation with the bail 192 to push the link 196 upwardly and rock lever 197 to depressed lip 199 and thereby operate the escapement mechanism so that the multiplier selection mechanism 60 moves one step to the left after entry of a multiplier digit into position for entry of the next lower multiplier figure. It will be noted that operation of the multiplier escapement is the only function required of the "0" slide 185.

From the above description, it will be apparent that successive operation of selected number keys of the typewriter will cause corresponding values to be successively entered from the highest to the lowest order in the multiplier selection mechanism carried by the multiplier selection carriage 60 of the calculator.

*Multiplicand selection.*—As seen in Figure 3, each multiplicand selection shaft 172 is extended through the bearing collar 211 and carries a splined portion 213. As seen in Figures 2, 3 and 7, each splined portion 213 is slidably engaged with the hub 214 of a selection lever 216, the hub 214 being journaled in a side wall 217 of a multiplicand selection carriage indicated generally at 218. As seen in Figure 2, the various selection levers 216 are positioned alternatively in opposite walls of the carriage 218 and have their ends disposed in two parallel lines which lie at opposite sides (Figure 3) of the key stems 219 to cooperate with one of a pair of rollers 220 carried at the lower end of each auxiliary key stem 219. Each key stem 219 has a value corresponding to the value of the associated selection lever 216, splined portion 213 and multiplicand selection shaft 172. Each key stem 219 forms part of a bank of auxiliary keys similar in construction to the keys 32 except that they are inverted. The keys 219 represent, from left to right in Figure 2, "0" to "9." The "1" to "5" keys 219 cooperate with the "1" to "5" selection rack 221, while the "6" to "9" keys 219 cooperate with the "6" to "9" rack 222. Each rack 221 or 222 is connected by a bellcrank 223 to the associated slide 51 or 51a of the keyboard selection mechanism of the calculator.

Thus when the multiplicand selection carriage 218 is aligned with a selected bank or order of the auxiliary keys 219, operation of a number key of the typewriter will set the corresponding value into the keyboard selection mechanism. The "1" to "9" keys 219 (Figure 2) of each bank are latched in depressed position by spring-urged latch slide 224 of conventional construction. Each latch slide 224 may be operated to release an active auxiliary key 219 by operation of the "0" number key of the typewriter. The latch slides 224 may be released as a gang by the engagement of extensions 224a thereof which project through front plate 225 of the auxiliary keyboard into cooperating relation with respective double acting cams 226 mounted on shaft 227 journaled on plate 225. Shaft 227 has arm 228 thereon operable manually by key 229, or operated automatically through link 230 from key-release bail 53 of the calculator keyboard as explained in said patent and said application.

As previously stated, the carriage 218 is shiftable from order to order of the auxiliary keyboard and for this purpose has respective rollers 231 (Figures 2 and 7) at its ends received in tracks 232 carried by brackets 212 of the frame. The carriage 218 also carries a depending block 233 having ball bearing connections 234 in respective tracks 236.

The carriage 218 is mounted for ordinal shifting movement and can be tabulated to a selected initial position and then moved back in step-by-step fashion as the values are entered into the multiplicand keyboard so that the multiplicand values can be entered from the highest through the lowest orders thereof. Depending block 233 of the carriage 218 (Figure 3) is connected by a rod 242 (Figures 3 and 5) to a shift rack 243 (Figure 5) having ordinally spaced teeth 244 for engagement with shift pins 245 carried by shift disc 246 secured on shaft 247. Spring urged centralizers 248 are engaged with the disc 246. Rack 243 has suitable guide bearings engaging support rods 249 and 250 (Figures 5 and 8).

Shaft 247 of the shift mechanism for the multiplicand selection carriage is connected by a drive connection consisting of a pair of spiral gears 251 (Figure 8) to vertical shaft 252 (Figures 5 and 8) which is connected by bevel gearing 253 with gear 254 driven by mutilated gear 256 (Figures 5 and 19) secured to gear 121. The number of teeth on gear 256 is selected so that shaft 247 receives a one-quarter turn near the end of each revolution of gear 121. Thus each time a number key is operated in writing off the multiplicand selection figure after entry of a multiplicand figure, the multiplicand selection carriage will be shifted towards its normal position (to the right in Figure 5) in cooperative relation with the next lower order of the auxiliary keyboard.

In order to initially position the multiplicand selection carriage for entry of the highest order multiplicand digit, shift drive shaft 247 (Figure 8) is connected by bevel gearing 261 to a shaft 262 which is suitably journalled in plates 177, and 178 and 175 of the machine in spaced parallel relation from a shaft 263. Mounted on one end of shaft 262 is a notched disc 265 which is centralized by spring-urged arms 270. The other end of shaft 262 carries a friction disc 275 riding under spring-urged arm 279. Shaft 263 carries pinion 264 which is driven by gear 266 on shaft 267. Shaft 267 also carries a worm wheel 268 driven from worm 269 on shaft 271 having a gear 272 driven from gear 273 on shaft 274. Shaft 274 carries a gear 276 meshing with gear 277 on the drive shaft of constantly running motor 278. Thus, shaft 263 (Figures 8 and 9) is also constantly driven. Shaft 263 is the drive shaft for a series of tabulating clutches indicated generally at 281 (Figures 9, 10, 18 and 19) for shifting the multiplicand selection carriage for one or more steps from its initial position (the units order).

Clutch 281 (Figures 18 and 19) comprises a housing 282 carrying a pivotal clutch dog 283 for engagement with driving ratchet 284 on shaft 263 under the influence of spring 286 when the clutch is engaged. Clutch housing 281 carries teeth 287 corresponding in number to the desired number of steps of movement of the selection carriage and adapted for meshing with a corresponding gear 288 on shaft 262. Normally the clutch dog 283 is held inactive by stud 291 (Figures 10 and 19) on clutch control lever 292. In this full cycle position, centralizer 293 engages in notched disc 294 on the clutch housing. Control lever 292 (Figure 10) is pivoted at 296 coaxially with a second control lever 297 to which it is connected by spring 298. Control lever 297 carries a stud 301 for operating lever 292 and a stud 302 for disengaging the clutch in half-cycle position. Lever 297 has a pin and slot connection 303 with a tab setting key 304 pivoted at 306 and urged upwardly by spring 307. Key 304 also overlies pin 308 on bellcrank 309 which is operatively related to centralizer 293.

Thus, upon depression of any one of keys 304 (Figure 1) the multiplier selection carriage will be tabulated to a desired position to begin the multiplicand setting operation.

When the typewriter and calculator are used independently of each other, the controls are conditioned as shown in Figure 1 with the control lever 179 at "neutral."

If a multiplication is to be performed and the multiplier value is to be entered first, the lever 179 is moved to the right as seen in Figure 1 which moves rail 154 to the left as viewed in Figures 5 and 13 to associate plungers 153 with keystems 151. Thus slides 164 (Figure 13) and sleeves 174 of the multiplier setting means will be operated upon operation of the number keys 86 (Figure 1). Then number keys are operated to write off the multiplier value from the highest to the lowest order digit so that this value is typed in the typewriter and entered into the multiplier selection mechanism simultaneously.

To enter the multiplicand value, the lever 179 is moved to the left in Figure 1, so that rail 154 is moved to the right in Figures 5 and 13 and plungers 152 are placed beneath keystems 151 and values can be transmitted through slides 163 (Figure 13), shafts 172 to multiplicand selection carriage 218. Before operation of the number keys, carriage 218 (Figure 3) is tabulated the required number of ordinal positions from its lowest order position by depression of a tabulating key 304. After carriage 218 is properly positioned the number keys are operated to enter the multiplicand value.

Either the multiplicand or multiplier values may be entered first but care should be taken that the tabulation of the multiplicand selection carriage 218 immediately precedes the entering of the multiplicand values.

After the multiplicand and multiplier values are entered, the multiplying operation is initiated and performed in the usual manner.

I claim:

1. An apparatus for utilizing a typewriter and a calculating machine for conjoint action to facilitate obtaining printed records of calculations where the calculating machine is of the type having two selecting mechanisms settable to different factors of a calculation, a keyboard above one selecting mechanism operable to set a multiplier factor therein, and a second keyboard above the second selecting mechanism operable to set a multiplicand factor therein: said apparatus comprising a base on which the typewriter and the calculating machine are mounted, a row of elements, each movable in response to operation of a corresponding numeral key in the typewriter, a series of members adapted to be positioned in cooperative relationship with said elements so that movement of one of said elements is imparted to the associated member, mechanism in said base for transmitting motion from said members to one of said selecting mechanisms, a second series of members adapted to be positioned in cooperative relationship with said elements so that movement of one of said elements is imparted to the associated member, and mechanism in said base for transmitting motion from said members to the other of said selecting mechanisms, whereby as the multiplier and multiplicand factors are printed in the typewriter they can be simultaneously set up in the selecting mechanisms of the calculating machine without employing the keyboards thereof.

2. An apparatus for utilizing a typewriter and a calculating machine for conjoint action to facilitate obtaining printed records of calculations where the calculating machine is of the type having two selecting mechanisms settable to different factors of a calculation, a keyboard above one selecting mechanism operable to set a multiplier factor therein, and a second keyboard above the second selecting mechanism operable to set a multiplicand factor therein; said apparatus comprising a base on which the typewriter and the calculating machine are mounted, a row of elements, each movable in response to operation of a corresponding numeral key in the typewriter, two series of members mounted in a common carrier in said base, means to adjust said carrier to bring either of said two series of members into cooperative relationship with said row of elements so that movement of one of said elements is imparted to the member cooperatively related thereto, and mechanism in said base actuated by members in one series to adjust one of said selecting mechanisms and actuated by members in the other series to adjust the other of said selecting mechanisms, whereby as the multiplier and multiplicand factors are printed in the typewriter they can be simultaneously set up in the selecting mechanisms of the calculating machine without employing the keyboards thereof.

ADOLPHUS S. DENNIS.